March 5, 1957 T. W. LEGATSKI ET AL 2,783,640
METHOD FOR TESTING NATURAL GAS
Filed March 1, 1954 2 Sheets-Sheet 1

INVENTORS
T.W. LEGATSKI
J.W. TOOKE
BY
ATTORNEYS

INVENTORS
T.W. LEGATSKI
J.W. TOOKE
BY Hudson & Young
ATTORNEYS

United States Patent Office 2,783,640
Patented Mar. 5, 1957

2,783,640

METHOD FOR TESTING NATURAL GAS

Theodore W. Legatski and James W. Tooke, Bartlesville, Okla., assignors to Phillips Petroleum Company, a corporation of Delaware Application March 1, 1954, Serial No. 413,264

2 Claims. (Cl. 73—23)

This invention relates to a method for testing a gas. In one of its aspects this invention relates to a method for determining the absorption index of a gas sample. In still another aspect this invention relates to a method for determining the mol percent heavier hydrocarbons in a natural gas sample.

In the processing of natural gas, it frequently becomes necessary or desirable to know the "butanes and heavier" or "propane and heavier" content of the gas. Most of the analytical methods currently employed for obtaining such information are costly, time-consuming, and must generally be performed in well equipped central laboratories. In many cases where such information is needed, a high degree of accuracy is not required, but speed in obtaining the information is desirable.

By our method, group analysis of the heavier hydrocarbon content of a gas containing relatively non-condensable gases such as methane and ethane, intermediate condensable gases such as, propane, and butane, and easily condensable vapors such as hexane and heavier can readily be made. Natural gas is illustrative of such as gas and since it is often desirable to make field analysis of natural gas, our invention will be described in terms of natural gas.

We have found that if a measured quantity of a reproducible pure hydrocarbon liquid solvent is brought into contact with a measured quantity of gas sample confined in a chamber under known conditions of temperature and pressure, the resulting final pressure on the system is related to the concentration of the readily condensable hydrocarbon fractions present in the gas. This final pressure is designated as the absorption index of the gas. By definition then, the absorption index is the equilibrium pressure in pounds per square inch absolute obtained when a measured volume of gas sample and a measured volume of liquid solvent are contacted under prescribed initial conditions of temperature and pressure.

An object of this invention is to provide a method for rapidly determining the absorption index of natural gas.

Another object of this invention is to provide a method for determining the mol percent of heavier hydrocarbons in a sample of natural gas.

Still another object of this invention is to provide a method for determining the percent "butanes and heavier" in a hydrocarbon gas sample.

Other objects and advantages of this invention will be apparent to those skilled in the art upon reading this specification and the appended claims.

We will further explain our invention by referring to the attached drawings which are made a part of this specification.

Figure 1:
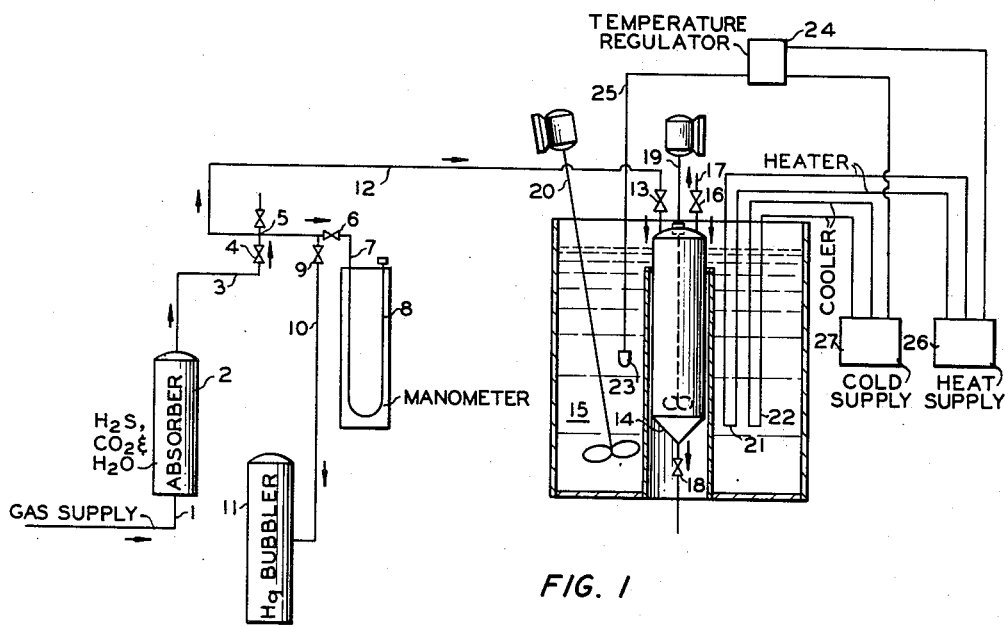
Figure 1 is a schematic drawing in block diagram showing one embodiment of an apparatus useful in the practice of our invention. The elements of this apparatus are spread out for the sake of clarity.

As was hereinbefore said, the quantity of readily condensable hydrocarbons in a natural gas sample is related to the absorption index. That is, we can determine the amount of propane and higher molecular weight hydrocarbons, butane and higher molecular weight hydrocarbons, pentane and higher molecular weight hydrocarbons contained in a natural gas.

In the practice of our invention the natural gas sample is introduced into a chamber of known volume, the temperature and pressure of the gas is adjusted to the desired level and then a known volume of a liquid solvent is added. The gas and liquid are thoroughly contacted and at the same time maintaining the initial temperature. After equilibirium conditions have been reached, the equilibrium pressure is read by means of a pressure measuring device. Since the amount of heavier hydrocarbons contained in the gas is related to this pressure, the pressure scale can be calibrated as mol percent. The gas-solvent volume ratio can vary over a wide range, the important thing being that enough solvent be present to essentially absorb all of the heavy fraction of hydrocarbon in the gas. In general the gas volume can vary from 1 to 1000 volumes, the liquid absorbent (solvent) from 0.1 to 500 volumes, the initial pressure from 5 to 500 pounds per square inch absolute, and the test temperature from $-32$ to $250°$ F. We prefer that the volume ratio of gas to liquid be no higher than 1000/1. Suitable liquid absorbents are those hydrocarbons having a molecular weight from 70 to 300 such as normal pentane, isopentane, normal hexane, 2-methylpentane, triptane, cyclohexane, normal octane, benzene, toluene, xylene, methylcyclohexane, cetane, and 2,2,5-trimethylhexane. Non hydrocarbon solvents may also be used.

To better describe how our invention can be used to determine the mol percent butanes and heavier in natural gas the following illustration is offered. The absorption index was determined on 34 samples of natural gas. These same gas samples were also analyzed by low temperature fractional analysis. These gas samples were taken in Reserve Field of Osage County, Oklahoma, the Texas Panhandle Field around Pampa, Texas, the Permian Basin around Odessa, Texas, and the Chocolate Bayou Field in Brazoria County, Texas. The butanes and heavier content ranged from less than five mol percent to almost 25 mol percent. The nitrogen content varied from less than 1 mol percent to almost 25 mol percent. Some of the samples were taken from oil wells, some from gas wells, and still others from gas-condensate wells. The samples from Oklahoma, the Panhandle, and Chocolate Bayou were generally sweet while those from the Permian Basin were generally sour.

The equilibrium pressure or absorption index as determined by our invention is influenced by an non-hydrocarbon contained in the natural gas sample. The most common of these are carbon dioxide, water, hydrogen sulfide and nitrogen. Carbon dioxide, water and hydrogen sulfide can be removed by passing the gas through sodium hydroxide absorbent such as "Ascarite" (sodium hydroxideon asbestos). As will be shown later, the effect of nitrogen is small and for practical purposes may be neglected.

Since a pressure of 14.7 pounds per square inch (760 mm.) absolute and $100°$ F. are relatively simple to maintain, these were selected as our initial conditions. We used normal octane as our solvent since it was available in plentiful supply and is easily obtained in pure form. We selected a gas to solvent volme ratio of 40:1 since one volume of normal octane will be sufficient to absorb essentially all of the condensables in 40 volumes of natural gas. For these conditions the absorption index will be the equilibrium pressure in pounds per square inch absolute obtained when 40 volumes of gas and 1 volume of liquid solvent are contacted at the initial pressure of 760 mm. of mercury and 100° F.

Referring to Figure 1, a sample of gas from gas sampling conduit 1 is passed through non-hydrocarbon absorber 2 where the $CO_2$, $H_2O$ and $H_2S$ were removed. If the main gas supply is under high pressure, the conduit 1 will be provided with a low pressure regulator. The thus purified gas passes from absorber 2 via conduit 3 and valve 4 to a four-way block 5. Valve 6 which is normally open and conduit 7 connect the four-way block to an absolute pressure manometer 8. The valve 9, normally open, and conduit 10 connects the block with a pressure relief valve (mercury bubbler) to prevent excessive pressure build up. The gas passes from the four-way block via conduit 12 and valve 13 to equilibrium chamber 14. This chamber is submerged in a constant temperature bath 15. The volume of the chamber is known and in our case is 967 ml. The chamber is completely flushed with fresh sample by allowing the gas to bleed through valves 16 and conduit 17. Valve 18 is provided for removing solvent from the equilibrium chamber. After filling the chamber 14, valves 4, 9 and 16 are closed. When the gas reaches equilibrium temperature (100° F.) with the bath, valve 13 is closed and the pressure is adjusted to 741.5 mm. Hg.

$$\left[ \frac{40 \text{ mols gas}}{40 \text{ mols gas} + 1 \text{ mol liq}} \times 760 \text{ mm (the desired initial pressure)} \right]$$

by bleeding gas through valve 16 and conduit 17. Then exactly $$23.6 \text{ ml.} \left( \frac{967 \text{ ml.}}{41 \text{ parts}} \right)$$

of solvent is added to chamber 14 via conduit 17 and valve 16 making the initial pressure 760 millimeters of mercury. Stirrer 19 is started and the gas and solvent are thoroughly contacted. When equilibrium is reached, valve 13 is opened and the pressure is again read on manometer 8. The bath is continuously circulated by means of stirrer 20.

The temperature of the bath is maintained with heater 21 and cooler 22. A temperature sensing element 23 is immersed in bath 15 and the sensing element is operatively connected to temperature regulator 24 via conduit 25. The temperature regulator is in turn operatively connected to a heat source 26 such as electrical supply and to a coolant source 27 such as cold water supply. The heat source is connected to the heater (electric heater) 21 and the collant source is connected to the cooler 22 (cold water conduit).

Those skilled in the art will see many modifications which can be made in the above-described apparatus. For example, the various elements of the apparatus can be made more compact than shown. The equilibrium chamber can be stirred by means of a magnetic stirrer or it can be made to rock in the bath. In either case, it would be unnecessary for the stirrer to pass through the chamber casing. The heat supply can be hot water and the cold supply can be a refrigerant, etc.

As has been said 34 natural gas samples were tested for equilibrium pressure using this equipment and under the above-described conditions. At the same time, low temperature fractional analysis were run on each gas sample. With the fractional analysis, the equilibrium pressure can be calculated for the prescribed temperature and pressure. This was done for the 34 samples and the calculated absorption index is plotted against the observed absorption index in Figure 2. If there had been perfect agreement, then the line connecting the points would be at 45°. It is seen that the observed absorption index is higher than that calculated by a more or less constant amount. Since the fractional analysis were made by skilled chemists and the observed absorption indices were determined in the field, it is assumed that the points falling away from the average line are due to errors made in the observed values. On the other hand, the calculated values are uniformally lower than the observed values and it is assumed that the K constants as taken from idealized K constant charts are not exactly applicable for this system. For that reason the calculated absorption indices are adjusted upward so that the agreement line will be 45°.

Figure 3:
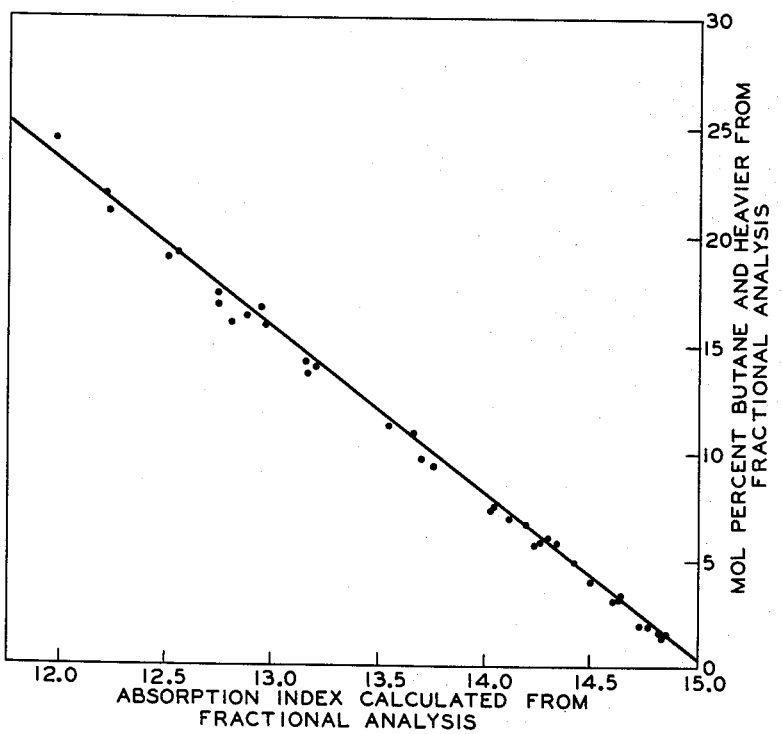
Figure 3 is a chart whereon the calculated absorption index is plotted against the mol percent butanes and heavier as determined by fractional analysis.

In Figure 3, the adjusted absorption indices, as obtained above, are plotted against the mol per cent butane and heavier as determined by fractional analysis. The average line drawn through these points is straight and therefore the slope of this line is the relationship between mol percent butane and heavier and the absorption index. Similar charts can be prepared for propanes and heavier, pentanes and heavier, etc. Also charts can be prepared for other initial pressure and temperature conditions.

This apparatus is of particular value in field testing of natural gas samples. Since the quantity of hydrocarbons having molecular weights greater than pentane is very small in natural gas, the method is generally not sufficiently accurate to be of much value in determining these hydrocarbons on an individual or group basis. Also since the ethane and methane are only slightly absorbed by the solvent under normal temperatures and pressures, the method is not sufficiently accurate for these materials. On the other hand, if proper conditions are chosen such charts can be prepared. The relationship between the mol percent of the hydrocarbons shown and the absorption index of the gas sample is linear.

As the dividing line between the relatively lighter and the relatively heavier hydrocarbons is raised so that the lighter fraction will contain readily condensables, the relationship may no longer be linear. However this would not detract from the usefulness of the method.

Figure 4:
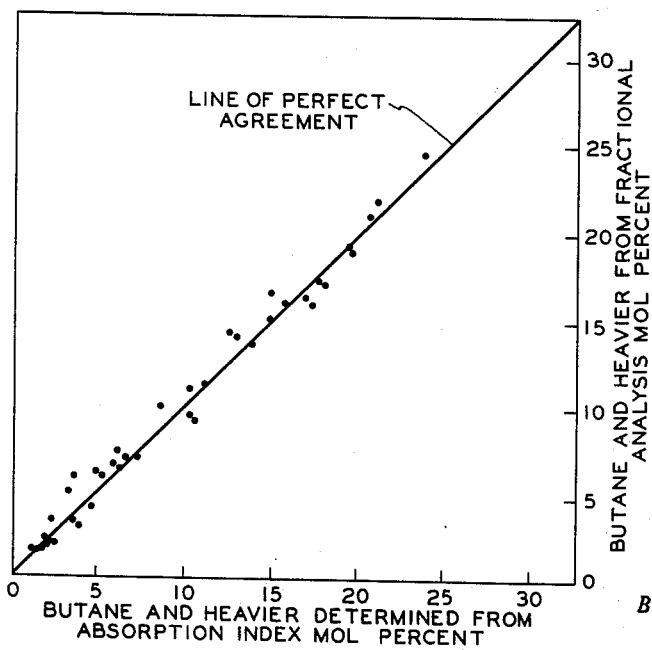
Figure 4 is a chart whereon the butane and heavier in mol percent as determined by absorption index is plotted against the mol percent butane and heavier as determined by fractional analysis.

Figure 4 is prepared to show the accuracy of this method. The mol percent butanes and heavier as determined from fractional analysis are plotted against the mol percent as determined by absorption index.

Figure 2:
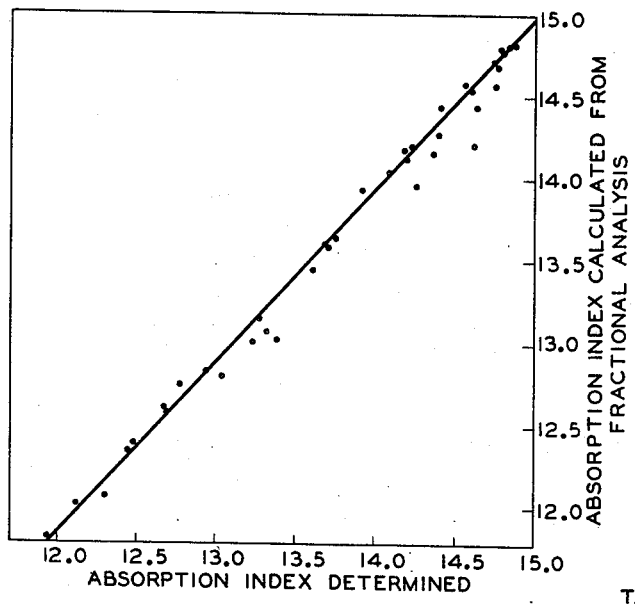
Figure 2 is a chart whereon the absorption index as determined by our method is plotted as the abscissa and the absorption index as calculated from fractional analysis is plotted as the ordinate.

Instead of plotting the observed absorption index against the calculated absorption index as was done in Figure 2 and then adjusting the calculated absorption index and plotting it against the mol percent of the desired fraction from fractional analysis as was done to obtain Figure 3, a suitable chart can be prepared by simply plotting the observed absorption index against the mol percent as determined by low temperature fractional analysis. While this latter method is not as accurate as the above described method, it is sufficiently accurate for most field testing purposes.

Since the quantity of readily condensable hydrocarbons in a natural gas is related to the absorption index as is shown in Figure 3, then the manometer 8 of Figure 1 can be calibrated to read in mol percent for a given set of original conditions. Ordinarily, the manometer will have multiple calibrations. For example, in filling the contacting chamber 14, it is convenient to have the manometer calibrated in millimeters of mercury. The absorption index is defined as the equilibrium pressure in pounds per square inch absolute, so the manometer should also be calibrated in pounds per square inch. As has been said, the manometer will also be calibrated in mol percent butanes and heavier.

Our method is also useful in determining the absorption index for use in the method of T. W. Legatski, J. W.

Tooke and L. A. Grundy for determining gas composition from its absorption index and its specific gravity as described in the Oil and Gas Journal 292, vol. 50, No. 12, July 27, 1953. T. W. Legatiski and J. W. Tooke are the instant inventors.

As has been hereinbefore indicated, the nitrogen content will have only a small effect on the absorption index and in most cases can be ignored. The date in the following table show the nitrogen effect.

| Sample | Nitrogen content, mol percent | Calculated absorption index | | Determined butanes and heavier mol percent | |
|---|---|---|---|---|---|
| | | Containing nitrogen | Nitrogen free | With nitrogen | Nitrogen free |
| 1 | 11.3 | 14.74 | 14.69 | 3 | 3.5 |
| 2 | 24.8 | 14.83 | 14.63 | 2.5 | 3.6 |

Those skilled in the art will see many modifications which can be made without departing from the scope of our invention. We have described our invention in terms of treating a natural gas sample. This method is useful whenever the gas sample is composed of multiple hydrocarbons ranging from light relatively non-condensable to relatively heavy and easily condensable. For example, the recycle gas in hydrogenation system and the off gas from hydrocarbon cracking.

We claim:
1. A method for determining the mol percent hydrocarbons having at least three carbon atoms per molecule in a natural gas sample, the said process comprising the gas sample over sodium hydroxide absorbent and thereby removing moisture, carbon dioxide and hydrogen sulfide from the gas sample, passing the thus purified gas sample to a contacting chamber of known volume; adjusting the gas temperature to 100° F.; adjusting the gas pressure to 741.5 millimeters of mercury; introducing $\frac{1}{41}\times$ volume of contacting chamber volumes of normal octane to the contacting chamber giving an equivalent initial pressure of 760 millimeters of mercury at 100° F.; bringing the gas and liquid to equilibrium at 100° F.; and measuring the equilibrium pressure in terms of mol percent hydrocarbons having at least three carbon atoms per molecule.

2. The method of claim 1 wherein the hydrocarbons having at least three carbon atoms per molecule are butanes and heavier.

References Cited in the file of this patent

UNITED STATES PATENTS

| | | |
|---|---|---|
| 1,282,409 | Gilbert | Oct. 22, 1918 |
| 2,286,384 | Sanderson | June 16, 1942 |
| 2,303,265 | Francis | Nov. 24, 1942 |
| 2,586,313 | Dwyer | Feb. 19, 1952 |